United States Patent [19]

Detering et al.

[11] Patent Number: 5,094,867
[45] Date of Patent: Mar. 10, 1992

[54] REMOVAL OF HEAVY METAL IONS FROM WINE AND WINE-LIKE BEVERAGES

[75] Inventors: Juergen Detering, Mannheim; Axel Sanner, Frankenthal; Bernhard Fussnegger, Kirrweiler, all of Fed. Rep. of Germany

[73] Assignee: BASF Aktiengesellschaft, Ludwigshafen, Fed. Rep. of Germany

[21] Appl. No.: 639,098

[22] Filed: Jan. 9, 1991

[30] Foreign Application Priority Data

Jan. 16, 1990 [DE] Fed. Rep. of Germany ....... 4000978

[51] Int. Cl.$^5$ .............................. A23L 2/30; C12G 1/00
[52] U.S. Cl. ................................ 426/271; 426/330.4; 426/422
[58] Field of Search ...................... 426/330.4, 271, 422

[56] References Cited

U.S. PATENT DOCUMENTS 2,926,086  2/1960  Chenicek et al. ................ 426/330.4

FOREIGN PATENT DOCUMENTS 88964  9/1983  European Pat. Off. .
1945749  4/1970  Fed. Rep. of Germany .

OTHER PUBLICATIONS

G. J. Loubser and R. D. Sanderson, "The Removal of Copper and Iron From Wine Using a Chelating Resin", vol. 7, No. 1, 1986, pp. 47–51, *S. Afr. J. Enol. Vitic.;* describes the use of 8-hydroxyquinoline bound to a copolymer of styrene and divinylbenzene.

*Primary Examiner*—Donald E. Czaja
*Assistant Examiner*—Helen Pratt
*Attorney, Agent, or Firm*—Oblon, Spivak, McClelland, Maier & Neustadt

[57] ABSTRACT

A process for removing heavy metal ions from wine and wine-like beverages, which entails treating each 100 l of the beverage with from 5 to 250 g of a polymer which contains, as copolymerized units, from 50 to 99.5% by weight of at least one basic vinylheterocycle with a $pK_a$ of not less than 3.8 and from 0 to 49.5% by weight of another copolymerizable monomer, and which has been prepared with the exclusion of oxygen and of polymerization initiators and in the presence of from 0.5 to 10% by weight, based on the monomers, of a crosslinker.

8 Claims, No Drawings

REMOVAL OF HEAVY METAL IONS FROM WINE AND WINE-LIKE BEVERAGES

The present invention relates to the use of a polymer based on a basic vinylheterocycle with a $pK_a$ of not less than 3.8 for removing heavy metal ions from wine and wine-like beverages.

FIELD OF THE INVENTION

Heavy metal cations (especially of iron, copper, zinc, tin, manganese and cadmium) when present in excessively high concentration in wine and wine-like beverages, i.e. those made from drupes, pomes and berries, adversely affect the organoleptic quality and the stability of these beverages. They may cause a metallic taste, be responsible for undesired color changes or give rise to obstinate hazing and cloudiness. In the processing of new wine to sparkling wine an excessively high heavy metal content is often the cause of unwelcome delays in fermentation. Some of the metals are also objectionable for toxicological reasons. This is why efforts are made to reduce the heavy metal content in these beverages, especially in wine.

The cloudiness in wine caused by heavy metals is a serious problem in wine making. The cloudiness is commonly caused by an excessively high iron content in the wine. Thus, there is cloudiness caused by iron phosphate (which is gray or white) and iron/tannin compounds (which is black). In some cases proteins are also involved in this cloudiness. Cloudiness due to copper is based on the formation of insoluble copper sulfide. The limits below which clarification is unnecessary are 4 ppm for iron and 0.5 ppm for copper.

Iron is absorbed through the roots of the vines in only relatively small amounts. The most important source is the equipment in the winery (corrosion). A small proportion of the iron may also derive from clarification of the wine with, for example, bentonite or active carbon. The main reasons for the copper content being too high are the use of copper-containing sprays and clarification of the wine with copper sulfate or, to a smaller extent, other agents.

PRIOR ART a) Processes used in the industry but remote from the invention:

Treatment of the wine with potassium hexacyanoferrate(II) is called blue fining and is mainly used to remove the Fe ions which are responsible for the cloudiness by precipitation as sparingly soluble Prussian blue. Other heavy metal ions (Cu, Zn, Mn and Cd) are coprecipitated. Blue fining is currently by far the most commonly used process for reducing the concentration of heavy metal ions. However, it has some serious disadvantages in terms both of winery technology and, especially, of toxicology. Thus, the amount of potassium hexacyanoferrate(II) required for clarification must be established accurately by preliminary tests because too high a dose results in the formation of hydrocyanic acid. Too low a dose may, however, lead to cloudiness. Subsequent testing is highly advisable in order to detect excessive doses in good time. Furthermore, Prussian blue tends to form a colloidal solution in the wine so that, for example, subsequent fining with silica sol/gelatin is necessary. Colloidal Prussian blue slowly agglomerates and sediments, the consequence being long waiting times with the risk of gradual decomposition of the Prussian blue with the formation of hydrocyanic acid. Equipment which has come into contact with potassium hexacyanoferrate(II) or Prussian blue must be treated extremely thoroughly with sodium carbonate solution in order to destroy excess reagent or adherent Prussian blue. In addition, since Prussian blue contains cyanide it is classified as special waste and must be disposed of appropriately.

Fessler's compound is used, particularly in the USA, for reducing the content of heavy metal ions in wine. The product comprises a mixture of various iron-containing hexacyanoferrates with a varying content of potassium hexacyanoferrate(II) together with potassium sulfate and water in the form of a paste. The active component is potassium hexacyanoferrate(II). This method of fining has the same disadvantages as the one described above. In addition, the potassium content of the wine is increased considerably, which leads to increased formation of tartar.

For red wine, treatment with calcium phytate is approved in place of blue fining. However, calcium phytate removes only trivalent iron. The contents of Cu, Zn and divalent Fe ions are not reduced. This insufficient reduction in the metal ion concentration is responsible for the limited effectiveness of the calcium phytate method. Another disadvantage is that the iron precipitates only very slowly and thus long waiting times are necessary. Cloudiness may occur if the waiting time is too short and aeration is inadequate.

b) Nearest prior art which has, however, to date not been used in practice because of serious disadvantages in the preparation and inadequate product properties:

DE-A 19 45 749 describes a process for removing phenols and/or metals from an aqueous medium (including beverages) using a polymeric sorbent which contains basic or cationic groups. The examples used are copolymers of maleic anhydride and $\alpha$-olefins such as ethylene, propylene or isobutylene and similar copolymers. These copolymers are crosslinked with a diamine and then modified with dimethylaminopropylamine. This is a multistage process entailing considerable preparative expense. A high-boiling aromatic solvent (xylene) is used. To remove impurities and xylene adherent to the product, the solid is washed with a considerable quantity of hexane. The organic solvents must be disposed of.

The use of the described sorbents specifically on beverages is confined to the removal of very small amounts of iron and copper from beer (Fe content: 0.26 ppm, Cu content: 0.06 ppm). Thus, no very exacting requirements have to be met by the absorption capacity. However, wine requiring treatment (Fe content $\leq 60$ ppm, Cu content $\leq 10$ ppm) needs a more efficient sorbent of high capacity.

This patent mentions N-vinylimidazole (NVI), among many others, as possible comonomer. However, neither the copolymerization of NVI nor the use of the resulting polymers is described in an example. The patent proprietors have evidently not attempted or attempted unsuccessfully to put this into practice.

Literature on the sorbents which can be used according to the invention:

European Patent 88964 describes a process for preparing insoluble granular polymers which swell only slightly in water from a basic N-vinylheterocycle (e.g. N-vinylimidazole) and its copolymers with up to 30% by weight of copolymerizable monomers. The binding of transition metal cations to prepare catalysts represents one use of the described polymers. These polymers have a wide range of uses especially as adsorber resins. They adsorb proteins, specifically enzymes, very well and are also suitable for removing interfering polyphenols and coloring matter from aqueous solutions by adsorption. Because of their affinity for proteins and polyphenols, the use (which is not mentioned therein) of the claimed polymers for the selective reduction of the concentration of heavy metal ions in beverages containing proteins and polyphenols did not appear promising.

It was all the more surprising to find that such polymers are outstandingly suitable for the selective removal of heavy metal ions from wine and wine-like beverages (initial total concentration range: 0.1–60 ppm) and thus for meeting a pressing need of wine makers.

SUMMARY OF THE INVENTION

Thus the invention comprises a process for removing heavy metal ions from wine and wine-like beverages, in which each 100 l of the beverage is treated with from 5 to 250, preferably 10 to 100, g of a polymer which contains, as copolymerized units, from 50 to 99.5, preferably 60 to 99, % by weight of at least one basic vinylheterocycle with a $pK_a$ of not less than 3.8, and from 0 to 49.5, preferably 0 to 40% by weight of another monomer which is copolymerizable under the polymerization conditions employed, plus from 0.5 to 10% by weight of a crosslinker. The polymerization conditions are: exclusion of oxygen and of polymerization initiators; presence of from 0.5 to 10, preferably 1 to 4% by weight, based on the total weight of monomers, of a crosslinker; temperature in the range from 30 to 200, preferably from 40° to 100° C.

Basic vinylheterocycles for the purposes of the invention are saturated and aromatic heterocycles with a vinyl group and at least one tertiary nitrogen in the ring, with a $pK_a$ of not less than 3.8. Besides vinyl, the ring can also be substituted by one or more alkyl of 1 to 4 carbons, phenyl or benzyl, or be fused to another ring. Examples are: N-vinylimidazole (NVI) and derivatives such as 2-methyl-1-vinylimidazole, 4-methyl-1-vinylimidazole, 5-methyl-1-vinylimidazole, 2-ethyl-1-vinylimidazole, 2-propyl-1-vinylimidazole, 2-isopropyl-1-vinylimidazole, 2-phenyl-1-vinylimidazole and 1-vinyl-4,5-benzimidazole. Other examples which can be used are 2-vinylpyridine, 4-vinylpyridine and 2-methyl-5-vinylpyridine. It is, of course, also possible to use mixtures of basic vinylheterocycles.

Suitable crosslinkers are those whose molecules contain two or more vinyl groups able to undergo free-radical copolymerization. Particularly suitable are alkylenebisacrylamides such as methylenebisacrylamide and N,N'-bisacryloylethylenediamine, also N,N'-divinylethyleneurea, N,N'-divinylpropyleneurea, ethylidene-bis-3-(N-vinylpyrrodlidone) and 1,4-bis (1-benzimidazolyl)butane. Examples of other crosslinking agents which can be used are alkylene glycol di(meth)acrylates such as ethylene glycol di(meth)acrylates such as ethylene glycol di(meth)acrylate and tetramethylene glycol di(meth)acrylate, aromatic divinyl compounds such as divinylbenzene and divinyltoluene, and allyl acrylate, divinyldioxane, pentaerythritol triallyl ether and mixtures thereof. Of course, when polymerization takes place in the presence of water, they are suitable only if they are soluble in the aqueous monomer mixture.

The same applies, of course, to the comonomers which can be copolymerized in amounts up to 49.5, preferably up to 40, % of the total weight of the monomer mixture. Suitable examples are styrene, acrylic esters, vinyl esters, acrylamide and, preferably, N-vinyllactams such as 3-methyl-N-vinylpyrrolidone, especially N-vinylcaprolactam and N-vinylpyrrolidone.

To carry out the polymerization without solvent, the monomer mixture composed of basic vinylheterocycle, the crosslinker and, where appropriate, N-vinyllactam or another comonomer is blanketed with nitrogen and then heated from 100° to 200°, preferably 150° to 180° C. It is advantageous to continue passing a gentle stream of nitrogen through the mixture. It is particularly advantageous to cause the mixture to boil by reducing the pressure. The mixture then polymerizes in from 1 to 20 hours depending on the nature of the monomers and the temperature. For example, polymerization of 2-methyl-1-vinylimidazole with 2% N,N'-divinylethyleneurea stirred with a powerful stirrer at 150° C. and under 310 mbar results in the first polymer particles after 2.5 h, and these slowly increase in size until the mixture is composed of a brownish powder after 10 h. After washing with water and drying, the novel polymer is obtained in the form of a coarse powder in yields exceeding 90%.

A preferred method of preparation is precipitation polymerization in water. The concentration of the monomers in the reaction mixture is expediently chosen so that the mixture remains easily stirrable throughout the reaction time. If there is too little water, the polymer particles become so sticky that stirring is more difficult than in the complete absence of water. With conventional stirred vessels the monomer concentration is expediently from about 5 to 30, preferably 8 to 15% of the weight of the aqueous mixture. It can be increased to 50% by weight if powerful stirrers are available. It may also be expedient to start the polymerization with a relatively concentrated solution and then to dilute with water as the reaction progresses. The polymerization is expediently carried out at a pH above 6 in order to avoid any hydrolysis of the comonomers and/or crosslinkers. The pH can be set by adding small amounts of bases such as sodium hydroxide or ammonia or the conventional buffer salts such as sodium carbonate or bicarbonate or sodium phosphate. Oxygen can be excluded by keeping the polymerization mixture boiling and/or using an inert gas such as nitrogen, as mentioned. In this case the polymerization can be carried out at from 30° to 150° C., preferably 40° to 100° C.

It may occasionally be advantageous to remove dissolved oxygen completely by adding, before or at the start of the polymerization, a small amount, from 0.01 to 1% of the weight of the monomer mixture, of a reducing agent such as sodium sulfite, pyrosulfite or dithionite, ascorbic acid or the like.

In a particularly preferred embodiment of the precipitation polymerization, the water-soluble comonomer (preferably NVP or an N-vinyllactam), part of the crosslinker, water and, where appropriate, a buffer and a reducing agent are heated under a gentle stream of nitrogen until the first polymer particles appear. Then a mixture, which has been blanketed with nitrogen, of the vinylheterocycle and the remaining crosslinker and, where appropriate, water as diluent is added over the course of 0.2 to 6 hours.

It is often possible to speed up the start of the polymerization by adding from 0.01 to 5% by weight, based on the monomer mixture, of a crosslinked polymer of low swellability based on basic vinylheterocycles with a $pK_a$ of not less than 3.8 or vinyllactams, especially N-vinylimidazole and N-vinylpyrrolidone.

The resulting polymer can be isolated from the aqueous suspension by filtration or centrifugation, followed by washing with water and drying in a conventional manner, such as in a circulating air or vacuum drying oven, or a paddle or pneumatic conveyor drier.

The polymers according to the invention combine the great advantage of being straightforward to prepare with the special advantages, which could not have been predicted, that they bind highly selectively and efficiently only the heavy metal ions but not further metal ions such as magnesium and calcium, nor to an undesired extent phenols or proteins or other constituents of wine. This means that their binding capacity is substantially saved for the undesired heavy metal ions so that the polymer can be used very sparingly and, nevertheless, an extremely low concentration of heavy metal ions approaching the detection limit can be achieved.

The wine treatment according to the invention comprises contacting it with the polymer for not less than one minute, preferably not less than one hour. This can be carried out batchwise by adding the polymer to the wine and removing it, or continuously using a column packed with the polymer. The amount of polymer to be used as sorbent depends not only on the required clarification, i.e. the initial concentration of metal ions and the desired final concentration, but also on the time available for the clarification process and is in the range from 5 to 250, preferably 10 to 100, g/100 l of wine. As is shown by the examples of use, there is a distinct reduction in the concentration of heavy metal ions even after a relatively short contact time. However, longer waiting times drastically increase the effectiveness of the polymers used according to the invention. It is advantageous to use the sorbents in a final clarification before bottling. Of course, in principle, use at an earlier stage of wine production is also possible.

The polymer powder has no taste or odor and is very readily filtered. The organoleptic quality of the wine clarified with these polymers is unaltered. The wine retains its typical aroma. The sorbents (polymers) can be regenerated easily by treatment with dilute acids, preferably mineral acids.

Although the polymers used according to the invention are prepared with the addition of only very small amounts of crosslinker (preferably 1-4% of the total weight of monomers) their swellability in water is only slight. They do not form gels. By contrast, when the abovementioned monomers are polymerized in aqueous solution in the presence of an initiator and of a crosslinker, the result is gel-type polymers. The degree of crosslinking and thus the swellability is substantially dependent on the amount of added crosslinker in this case. In order to prepare a gel-type polymer which has the same swellability as the polymers used according to the invention more than 20% by weight of crosslinker is required. These highly crosslinked gels have, because of their morphology, a distinctly lower sorption capacity for heavy metal cations than do the porous polymers used according to the invention (see Example 13). Gel-type polymers containing less than 5% crosslinker are very highly swellable and have serious disadvantages in terms of preparation, general handling and use: they block the reaction vessel and can be neither stirred nor tipped out, and large quantities of solvent have to be evaporated for drying. Swelling is necessary before use and they cannot be poured in this state. They form an annoying deposit on the filter layer and the filter cakes are not loosely packed. Thus they are not easy to filter in contrast to the polymers used according to the invention. In addition, columns packed with gel-type polymers are prone to blockage.

In the Examples, parts and percentages are by weight.

Synthetic Examples

EXAMPLE 1

A mixture of 50 parts of N-vinylimidazole, 30 parts of 2-methyl-1-vinylimidazole and 30 parts of N-vinylpyrrolidone with the addition of 3 parts of N,N'-divinylethyleneurea was heated to 160° C. in a stirred vessel with reflux condenser under 250 mbar. The first insoluble polymer particles appeared after about 90 min. After stirring for a further 2 h the reaction mixture was a dry powder, which was then washed on a suction filter and dried in a circulating air oven at 60° C. The yield was 93.5%.

EXAMPLE 2

A mixture of 11.5 parts of N-vinylimidazole (NVI), 2.5 parts of N-vinylpyrrolidone (NVP), 0.3 part of N,N'-divinylethyleneurea, 138 parts of $H_2O$ and 0.1 part of 5% strength sodium hydroxide solution was introduced into a stirred apparatus with reflux condenser and, after addition of 0.1 part of a crosslinked NVI- and/or NVP-based polymer of low swellability, heated to 70° C. under a stream of nitrogen. Polymerization was carried out at this temperature for 6 h. The precipitated polymer was filtered off with suction, thoroughly washed with water and dried in a circulating air oven at 60° C. A white granular product was obtained in a yield of 96.5%.

EXAMPLE 3

The polymerization was carried out as described in Example 2 but the monomer mixture was composed of 10 parts of N-vinylimidazole, 2 parts of N-vinylpyrrolidone, 2 parts of N-vinylcaprolactam and 0.3 part of N,N'-divinylethyleneurea. The yield was 97%.

EXAMPLE 4

A mixture of 5 parts of N-vinylpyrrolidone, 0.1 part of N,N'-divinylethyleneurea (DVEU), 50 parts of $H_2O$ and 0.5 part of 5% strength sodium hydroxide solution was introduced into a stirred vessel and heated to 60° C. under a stream of nitrogen. 0.01 part of sodium dithionite was added and the mixture was then stirred at 70° C. for 60 min. A solution of 10 parts of N-vinylimidazole and 0.1 part of DVEU in 50 parts of $H_2O$ was metered into the resulting suspension over the course of 3 h. Polymerization was then continued at 70° C. for 2 h. Working up was as described in Example 2. The product was obtained in the form of fine white granules in a yield of 95%.

EXAMPLE 5

The polymerization was carried out as described in Example 4 but the added mixture was composed of 14 parts of N-vinylimidazole, 0.2 part of N,N'-divinylethyleneurea and 28 parts of water. The yield was 96%.

EXAMPLE 6

The polymerization was carried out as described in Example 4 but the added mixture was composed of 20 parts of 4-vinylpyridine and 0.2 part of N,N'-divinylethyleneurea. In order to keep the suspension stirrable it was diluted with 30 parts of water halfway through the metering in. The yield was 93%.

COMPARATIVE EXAMPLE

Crosslinked polyvinylimidazole prepared with a radical initiator 72 parts of N-vinylimidazole, 28 parts of N,N'-divinylethyleneurea and 1.6 parts of azodiisobutyronitrile were dissolved in 550 parts of water and heated at 80° C. for 4 h. The resulting gel-type polymer was filtered off with suction, washed with water and dried at 60° C. under reduced pressure. A pale yellow polymer was obtained in virtually quantitative yield.

Examples of use

The amounts used in the Examples are in each case based on the solids content of the sorbents.

EXAMPLE 7

1 l samples of a wine with an iron content of 11.5 ppm and a pH of 3.4 were each mixed with 0.5 g of the insoluble sorbents from I, II, III and IV, all of low swellability. The mixtures were stirred at room temperature for 2 h or 16 h. The sorbents were removed using a membrane filter. The residual iron content was determined by atomic emission spectroscopy.

Sorbent I: Synthesized as described in Example 1, particle size<250 μm
Sorbent II: Synthesized as described in Example 2, particle size<250 μm
Sorbent III: Synthesized as described in Example 3, particle size<250 μm
Sorbent IV: Synthesized as described in Example 4, particle size<250 μm

|  | Amount used [g/l] | Contact time [h] | Fe content [ppm] | pH |
| --- | --- | --- | --- | --- |
| Initial sample |  |  | 11.5 | 3.4 |
| Sorbent I | 0.5 | 2 | 8.3 | 3.4 |
| Sorbent I | 0.5 | 16 | 3.3 | 3.4 |
| Sorbent II | 0.5 | 2 | 6.1 | 3.4 |
| Sorbent II | 0.5 | 16 | 0.7 | 3.4 |
| Sorbent III | 0.5 | 2 | 7.0 | 3.4 |
| Sorbent III | 0.5 | 16 | 2.4 | 3.4 |
| Sorbent IV | 0.5 | 2 | 5.2 | 3.4 |
| Sorbent IV | 0.5 | 16 | 0.3 | 3.4 |

There was no change in the contents of sodium, potassium, magnesium or calcium.

EXAMPLE 8

25 l samples of a wine with an iron content of 13.5 ppm, a copper content of 2.0 ppm and a pH of 3.5 were each mixed with 12.5 g of sorbents II and IV. The insoluble sorbents were stirred in the wine for 12×30 s over the course of 60 h. They were removed with a membrane filter. The residual iron and copper contents were determined by atomic emission spectroscopy.

Sorbent II: Synthesized as described in Example 2, particle size<250 μm
Sorbent IV: Synthesized as described in Example 4, particle size<250 μm

|  | Amount used [g/l] | Contact time [h] | Fe content [ppm] | Copper content [ppm] |
| --- | --- | --- | --- | --- |
| Initial sample |  |  | 13.5 | 2.0 |
| Sorbent II | 0.5 | 16 | 4.4 | 0.4 |
| Sorbent II | 0.5 | 24 | 2.8 | 0.2 |
| Sorbent II | 0.5 | 60 | 0.3 | <0.1 |
| Sorbent IV | 0.5 | 16 | 2.9 | 0.1 |
| Sorvent IV | 0.5 | 24 | 1.3 | <0.1 |
| Sorbent IV | 0.5 | 60 | <0.1 | <0.1 |

There was no change in the contents of sodium, potassium, magnesium or calcium. The pH remained constant.

EXAMPLE 9

1 l of a wine with a copper content of 10.3 ppm (after clarification with copper sulfate) and a pH of 3.4 was mixed with 0.15 g of sorbent II (particle size<250 μm). The crosslinked sorbent of low swellability was stirred in the wine for 30 s every 8 hours. It was removed with a membrane filter. The residual copper content was determined by atomic emission spectroscopy.

Sorbent II was prepared as described in Example 2.

|  | Amount used [g/l] | Contact time [h] | Cu content [ppm] | pH |
| --- | --- | --- | --- | --- |
| Initial sample |  |  | 10.3 | 3.4 |
| Sorbent II | 0.15 | 48 | 0.6 | 3.4 |
| Sorbent II | 0.15 | 96 | <0.1 | 3.4 |

EXAMPLE 10

1 l samples of a wine from a corroded stainless steel tank with an iron content of 27.8 ppm, a copper content of 3.3 ppm and a pH of 3.3 were each mixed with 0.5 or 1.0 g of sorbent V (particle size<250 μm). The insoluble sorbent was stirred in the wine for 30 s every 6 hours. It was removed with a membrane filter. The residual iron and copper contents were determined by atomic emission spectroscopy.

Sorbent V was prepared as described in Example 5.

|  | Amount used [g/l] | Contact time [h] | Fe content [ppm] | Cu content [ppm] |
| --- | --- | --- | --- | --- |
| Initial sample |  |  | 27.8 | 3.3 |
| Sorbent V | 0.5 | 72 | 6.3 | <0.1 |
| Sorbent V | 1.0 | 72 | 2.1 | <0.1 |
| Sorbent V | 0.5 | 144 | 1.3 | <0.1 |
| Sorbent V | 1.0 | 144 | 0.3 | <0.1 |

The pH remained constant.

EXAMPLE 11

Comparison of the absorption capacity for heavy metals in wine of various chelating and exchanger resins 1 l samples of a wine with an iron content of 13.0 ppm, a copper content of 3.0 ppm and a pH of 3.4 were each mixed with 0.3 g of the various sorbents. The mixtures were stirred at room temperature for 16 h. The sorbents were removed with a membrane filter. The residual iron content was determined by atomic emission spectroscopy.

Sorbent IV: Synthesized as described in Example 4, particle size<250 μm

Sorbent VI: Synthesized as described in Example 6, particle size <250 μm

Sorbent VII: Chelite N (Serva), crosslinked macroporous chelating resin with amidoxime groups, particle size <250 μm Sorbent VIII: Chelite P (Serva), porous resin, styrene-/divinylbenzene matrix with aminoethylphosphonate groups, particle size <250 μm Sorbent IX: Amberlite IRA 68 (Rohm & Haas), weakly basic anion exchanger, crosslinked and highly porous, particle size <250 μm

|  | Amount used [g/l] | Contact time [h] | Fe content [ppm] | Copper content [ppm] |
| --- | --- | --- | --- | --- |
| Initial sample |  |  | 13.0 | 3.0 |
| Sorbent IV | 0.3 | 16 | 0.3 | 0.2 |
| Sorbent VI | 0.3 | 16 | 1.7 | 0.7 |
| Sorbent VII | 0.3 | 16 | 8.4 | 2.5 |
| Sorbent VIII | 0.3 | 16 | 5.1 | 2.5 |
| Sorbent IX | 0.3 | 16 | 2.3 | 2.3 |

The Example shows the excellent absorption capacity of the sorbents IV and VI used according to the invention compared with the chelating and exchanger resins VII to IX.

EXAMPLE 12

1 l samples of a wine with an iron content of 12.3 ppm, a copper content of 3.0 ppm and a pH of 3.4 were each mixed with 0.25 g of sorbents V and X. The mixtures were stirred for 2, 4 and 24 h. The sorbents were removed by membrane filtration. The residual iron and copper contents were determined by atomic emission spectroscopy.

Sorbent V was prepared as described in Example 5, the polymer containing about 72% NVI. Sorbent X is a crosslinked gel-type polymer based on NVI and DVEU which was prepared as described in the Comparative Example. The polymer likewise contains about 72% NVI. Both sorbents (particle size <250 μm) have the same swellability.

|  | Amount used [g/l] | Contact time [h] | Fe content [ppm] | Copper content [ppm] |
| --- | --- | --- | --- | --- |
| Initial sample |  |  | 12.3 | 3.0 |
| Sorbent V | 0.25 | 2 | 5.0 | 0.9 |
| Sorbent V | 0.25 | 4 | 2.8 | 0.6 |
| Sorbent V | 0.25 | 24 | 0.2 | 0.1 |
| Sorbent X | 0.25 | 2 | 10.6 | 1.3 |
| Sorbent X | 0.25 | 4 | 9.5 | 1.0 |
| Sorbent X | 0.25 | 24 | 8.9 | 0.8 |

The Example shows the excellent absorption capacity of the sorbent V used according to the invention compared with the gel-type polyvinylimazole prepared with a radical initiator.

We claim:

1. A process for removing heavy metal ions from wine or wine made from drupes, pomes or berries, which comprises contacting, for not less than one minute, each 100 l of said wine or said wine made from drupes, pomes or berries with 5 to 250 g of a polymer which contains, as copolymerized units, from 50 to 99.5% by weight of at least one basic vinylheterocycle with a $pK_a$ of not less than 3.8, and from 0 to 49.5% by weight of another copolymerizable monomer and which has been prepared with the exclusion of oxygen and of polymerization initiators and in the presence of from 0.5 to 10% by weight, based on the monomers, of a crosslinker; and then separating said polymer from said wine or said wine made from drupes, pomes or berries.

2. A process as claimed in claim 1, wherein a polymer which contains as basic vinylheterocycle N-vinylimidazole or 2-methyl-1-vinylimidazole or a mixture of the two is employed.

3. A process as claimed in claim 1, wherein a polymer which contains as basic vinylheterocycle 2-vinylpyridine, 4-vinylpyridine or 2-methyl-5-vinylpyridine is employed.

4. A process as claimed in any of claims 1 to 3, wherein a polymer which contains as comonomer only N-vinylpyrrolidone or N-vinylcaprolactam or a mixture of the two is employed.

5. A process as claimed in any of claims 1 to 3, wherein a polymer which contains as crosslinker N,N'-divinylethyleneurea is employed.

6. A process as claimed in any of claims 1 to 3, wherein a polymer which has been prepared in the presence of a reducing agent is employed.

7. A process as claimed in any of claims 1 to 3, wherein a polymer which has been prepared in the presence of water at from 30° to 150° C. is employed.

8. A process as claimed in any of claims 1 to 3, wherein a polymer which has been prepared without solvent at from 100° to 200° C. is employed.

* * * * *